VARIABLE DELAY LINE WITH VIBRATION ABSORBING TERMINATION

Inventors:-
Marvin E. Cox,
Willard A. Schooley,
BY Mueller & Aichele
Attys.

VARIABLE DELAY LINE WITH VIBRATION ABSORBING TERMINATION

Filed Feb. 10, 1964 2 Sheets-Sheet 2

Inventors:—
Marvin E. Cox,
Willard A. Schooley,
BY Mueller & Aichele
Attys.

3,262,074

VARIABLE DELAY LINE WITH VIBRATION ABSORBING TERMINATION

Marvin E. Cox, Oak Lawn, and Willard A. Schooley, Cicero, Ill., assignors to Motorola, Inc., Chicago, Ill., a corporation of Illinois Filed Feb. 10, 1964, Ser. No. 343,602
9 Claims. (Cl. 333—30)

This invention relates to a variable delay line in which the delay is accomplished by propagating a pressure wave in a delay line wire, and in particular to a structure for securing and dampering the ends of the delay line wire to minimize reflections therefrom.

In many electrical devices it is desirable to delay electrical signals for periods of time longer than feasible using purely electrical circuits. One way in which this has been accomplished has been to convert the signal to a pressure wave in a wire by means of a transducer. A second transducer coupled to the wire at a predetermined distance from the first transducer, receives the pressure wave and generates an electrical signal therefrom. The distance along the wire between the first and second transducers and the speed of the pressure wave in the wire determine the duration of the time delay. Since the propagation of the pressure wave along the wire is considerably slower than the propagation of an electrical signal through a conductor, long time delays may be developed in this manner.

In a delay line of this type, the pressure wave can be reflected from the ends of the wire causing distortion of the signals in the wire and also producing a noise signal which raises the minimum signal level which can be carried by the delay line wire. In order to prevent reflections from the end portions of the wire, it is neccessary that these end portions be secured in such a manner that energy reaching the end of the wire is absorbed and not reflected.

Accordingly, it is an object of this invention to provide a variable delay line with an improved means for mechanically securing the ends of the delay line wire so as to minimize reflections from the end portions.

A feature of this invention is the provision of a variable delay line having a delay line wire in which the end portions of the delay line wire are secured to a delay line drum by mechanical clamps.

Another feature of this invention is the provision of a variable delay line having a delay line wire and in which the end portions of the wire are substantially surrounded by an energy absorbing material to prevent reflections from the ends of the wire.

The invention is illustrated in the drawings wherein.

In practicing this invention, a delay line structure is provided consisting of a hollow cylindrical drum having a rectangular spiral groove cut on the inside. A delay line wire made from a nickel alloy such as Elinvar and having magnetostrictive properties is coiled in the groove to form a helix. An input transducer, consisting of a coil of wire wound around a hollow cylindrical jewel, through which the delay line passes, is moved along the inside surface of the drum. As the input transducer is moved along the inside surface of the drum, the delay line wire is removed from the groove, passes through the jewel and is returned to the groove. Electrical signals coupled to the input transducer cause it to generate a magnetic field which develops a pressure wave in the delay line wire. The pressure wave travels through the delay line wire to a receiving transducer including a piezoelectric crystal which converts the pressure wave to an electrical signal corresponding to the input signal but delayed in time. The length of wire extending between the two transducers determines the amount of delay.

The end portions of the delay line wire are mechanically secured to the hollow cylindrical drum by clamps and are substantially surrounded by a silicone compound which fills the grooves wherein the delay line wire is positioned. The silicone compound surrounding the end portions of the delay line wire absorbs the energy of the pressure wave reaching the end portions to prevent reflections therefrom.

Figures 1, 3:
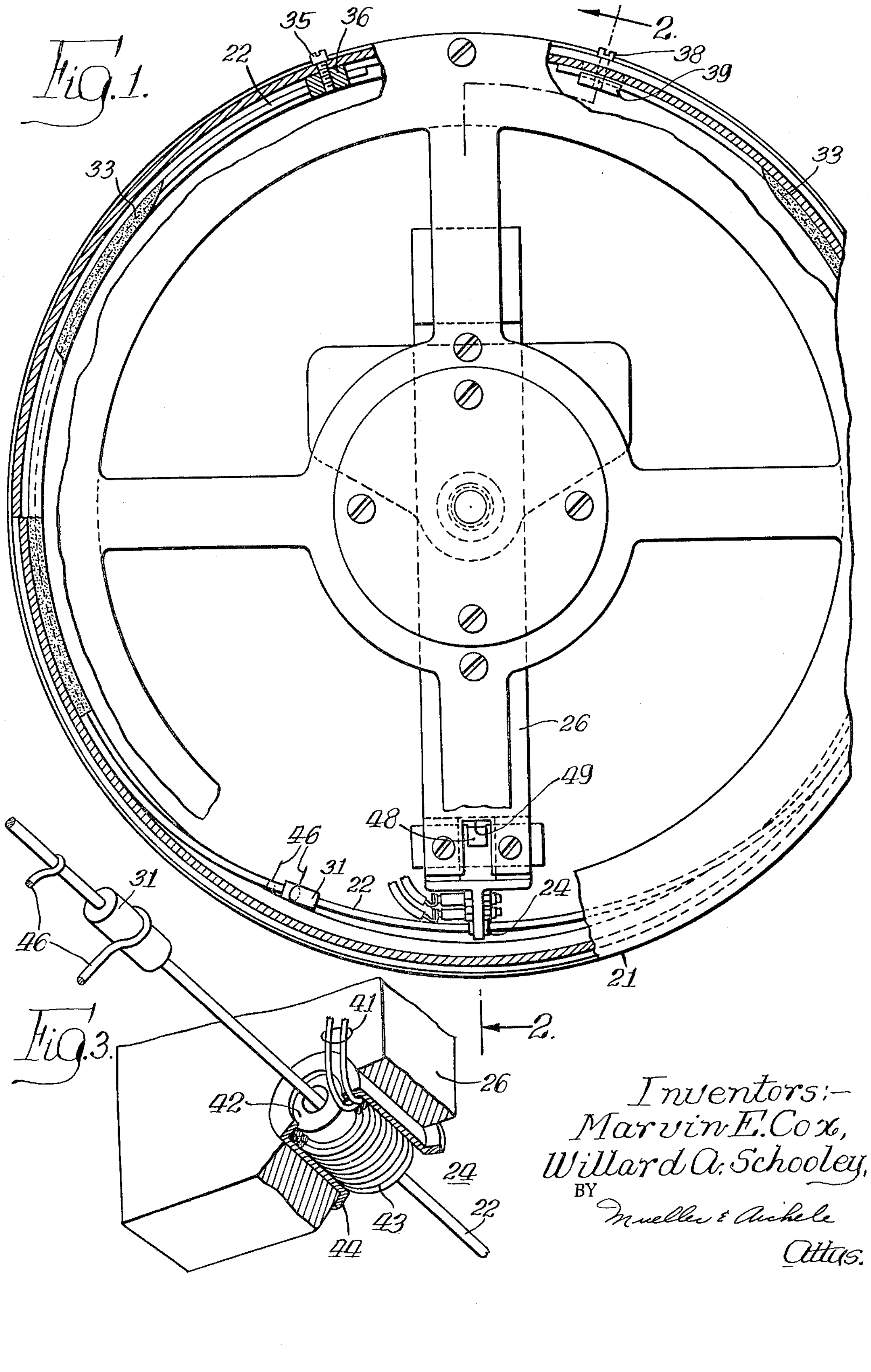
FIG. 1 is a drawing of a variable delay line structure incorporating the features of this invention.
FIG. 3 is an enlarged view illustrating the relationship between the input and output transducer and the delay line wire.
Figure 2:
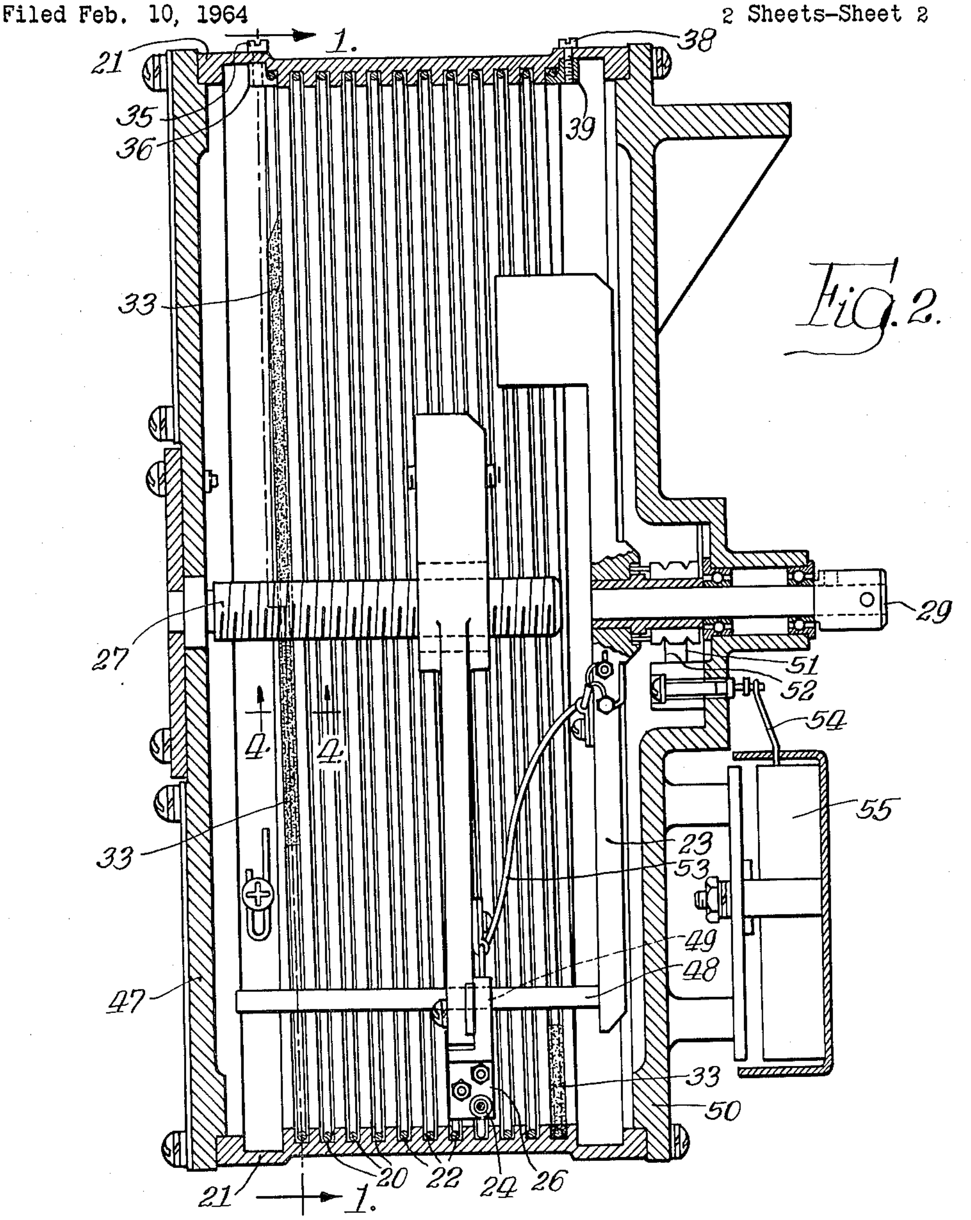
FIG. 2 is a cross sectional view of the structure shown in FIG. 1.

A delay line incorporating the features of this invention is shown in FIGS. 1 and 2. Similar portions of the two figures have the same identifying numerals. The delay line includes a circular drum 21 having a rectangular spiral groove 20 on the inside surface. A delay line wire 22 formed of a nickel alloy such as Elinvar and having magnetostrictive properties rests within the groove forming a helix. An end plate 47 is secured to drum 21 and supports a threaded rod 27 centrally positioned within drum 21. One end of an arm 26 is threaded on rod 27 while the other end of arm 26 supports a transmitting transducer 24. The pitch of screw 27 is the same as that of groove 20 so that as arm 26 is rotated the end of arm 26 supporting transducer 24 advances along the inside surface of the drum 21 with transducer 24 always opposite groove 20. Arm 26 is rotated by rod 48 which passes through opening 49 in arm 26. Rod 48 is connected to an external shaft 29 by arm 23. Shaft 29 is mounted on end plate 50 which is secured to drum 21. Rotating shaft 29 causes arm 26 to rotate and move transducer 24 along the surface of drum 21. Transducer 24 is connected to amplifier 55 by cable 53, slip rings 35 and 37 and cable 38. A piezoelectric receiving transducer 31 is rigidly fixed to wire 22.

An enlarged view of transmitting transducer 24 and receiving transducer 31 is shown in FIG. 3. Transmitting transducer 24 consists of a hollow cylindrical jewel 42 through which delay line wire 22 passes. Jewel 42 provides a bearing surface for delay line wire 22. A coil of wire 43 is wound around bearing 42 and is coupled to a source of electrical signals by wires 41. An electrical signal applied to the coil of wire 43 generates a magnetic field which develops a pressure wave in delay line wire 22 by means of the magnetostrictive effect. A mu-metal shield 44 is provided to minimize the external field produced by coil 43.

A receiving transducer consisting of a hollow cylindrical piezoelectric crystal 31 surrounds delay line wire 22. The crystal is mechanically and electrically bonded to delay line wire 22. The pressure wave received by transducer 31 deforms the crystal and thereby produces an output signal. The signal developed by transducer 31 is coupled to an output amplifier by wires 36.

In operation an input signal to be delayed is applied to transmitting transducer 24 from amplifier 55. The signal applied to transducer 24 creates a pressure wave in delay line wire 22 by means of the magnetostrictive effect. This pressure wave is propagated along delay line wire 22 to receiving transducer 31 where it is converted to an output signal, corresponding to the input signal, by transducer 31 which utilizes the piezoelectric effect. The delay duration between the input and output signals is determined by the length of wire 22 extending between transmitting transducer 24 and receiving transducer 31.

Referring to FIGS. 1 and 2, one end of delay line wire 22 is clamped to drum 21 by dog 36 and screw 35 extending through the drum. The other end portion of delay line wire 22 is clamped to drum 21 by means of dog 39 and screw 38. Dogs 36 and 39 rigidly secure delay line wire 22 to the drum. However, any pressure waves in the wire reaching this clamping means will be reflected therefrom, and will travel through delay line wire 22 in the reverse direction producing noise and distortion. To minimize the reflections from the end portions of delay line wire 22, that part of groove 20 containing the end of portions of wire 22 is filled with a silicone compound 33. The silicone compound surrounds the end portions of wire 22 and absorbs the energy reaching the end portions of the delay line wire.

Figure 4:
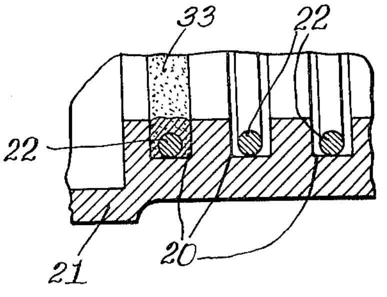
FIG. 4 is an enlarged view of the drum showing the location of the wires and sound absorbing material surrounding them.

FIG. 4 shows an enlarged cross sectional view of a groove 20 containing an end portion of delay line wire 22. The groove containing the end portion is filled with silicone compound 33 so that delay line wire 22 is substantially surrounded by the silicone rubber mixture.

An example of a damping compound which can be used in a delay line of this type consists of a mixture of RTV–20 Silicone, a hardener, Thermolite No. 12 and a solvent to lower the viscosity of the resulting mixture. Normally the RTV silicone is diluted with a non-hardening di-methyl-silicone fluid such as D.C. 200. This is objectionable in a delay line of this type in that a bleeding out of the D.C. 200 results in abnormal dust collection in the equipment. For use in a delay line the mixture is diluted with a volatile solvent such as methylene chloride. A mixture including 20 grams of RTV–20 Silicone and from 3 grams to 15 grams of methylene chloride has been found to give good results in absorbing energy from the delay line wire.

Since curing takes place prior to the loss of all the methylene chloride from the mixture, some methylene chloride vapor is trapped in the cured rubber. This results in a rubber which is full of small gas pockets after the cure is complete. Subsequently, the methylene chloride vapor diffuses out of the pockets and is replaced by air. The final result is a closed cell foam silicone which absorbs substantially all of the sonic energy reaching the end of the delay line 22. The closed cell foam structure of the silicone increases the ability of the silicone to absorb energy from the wire.

Thus a delay line structure has been shown which incorporates means for absorbing energy reaching the end portions of the delay line wire. The absorption of this energy prevents reflections from the end portions and reduces the noise present in the delay portion of the delay line wire to a level which will not interfere with the desired signal.

We claim:

1. In a delay line wherein the delay is established by propagating a stress wave along a wire, the combination including, a supporting structure having a groove thereon, a wire positioned within said groove, said wire having end portions not used for estabilshing the delay, and means damping said wire including resilient means filling the portion of said groove containing said end portions and substantially surrounding said end portions for absorbing the energy of the stress wave and preventing reflections of the stress wave from said end portions.

2. In a delay line wherein a delay is established by propagating a stress wave along a wire, the combination including, a hollow cylinder threaded on the inside surface thereof, a wire positioned within the sides of and adjacent to the roots of said threads, said wire having end portions not used for establishing the delay, clamping means for securing said end portions within said threads, and means damping said wire including resilient means filling said threads containing said end portions and substantially surrounding said end portions for absorbing the energy of the stress wave and preventing reflections of the stress wave from said end portions.

3. In a delay line wherein a delay is established by propagating a stress wave along a wire, the combination including, a hollow cylinder threaded on the inside surface thereof, a wire positioned within the sides of and adjacent to the roots of said threads, said wire having end portions not used for establishing the delay, and means damping said wire including a resilient closed cell foam material filling said threaded surface containing said resilient material, said resilient material substantially surrounding said end portions for absorbing the energy of the stress wave and preventing reflections of the stress wave from said end portions.

4. In a delay line wherein a delay is established by propagating a stress wave along a wire, said delay line including in combination, a hollow cylinder having a spiral groove on the inside surface thereof, said groove being substantially rectangular in cross section, a wire positioned within said groove and forming a helix, said wire having end portions not used for establishing the delay, means damping said wire including a silicone compound filling said grooves containing said end portions and substantially surrounding said end portions for absorbing the energy of the stress wave and preventing reflections of the stress wave from said end portions.

5. In a delay line wherein a delay is established by propagating a stress wave along a wire, said delay line including in combination, a hollow cylinder having a spiral groove on the inside surface thereof, said groove being substantially rectangular in cross section, a wire positioned within said groove and forming a helix, said wire having end portions not used for establishing the delay, clamping means for securing said end portions within said groove, means damping said wire including a closed cell foam silicone compound substantially surrounding said end portions for absorbing the energy of the stress wave and preventing reflections of the stress wave from said end portions.

6. In a delay line wherein a delay is established by propagating a stress wave along a wire, said delay line including in combination, a hollow cylinder having a spiral groove on the inside surface thereof, said groove being substantially rectangular in cross section, a wire positioned within said groove and forming a helix, said wire having end portions not used for establishing the delay, a closed cell foam resilient material including a mixture of RTV-20 silicone and methylene chloride, said resilient material substantially surrounding said end portions for absorbing the energy of the stress wave and preventing reflections of the stress wave from said end portions.

7. A delay line wherein a delay is established by propagating a stress wave along a wire, said delay line including in combination, a hollow cylinder of magnetic material having a spiral groove on the inside surface thereof, said groove being substantially rectangular in cross section, a wire positioned within said groove and forming a helix, first and second transducer means coupled to said wire, said first transducer means being responsive to an electrical signal applied thereto to impart a stress wave to said wire, said second transducer means being responsive to said stress wave to develop an electrical signal, means coupled to one of said transducer means for moving the same along said wire relative to the other of said transducer means, the duration of the delay being proportioned to the length of said wire positioned between said transducer means, said wire having end portions not positioned between said transducer means and not used for establishing the delay, clamping means for securing said end portions within said groove, and means damping said wire including resilient means filling said groove containing said end portions and substantially surrounding said end portions for absorbing the energy of the stress wave and preventing reflection of the stress wave from said end portions.

8. A delay line wherein a delay is established by propagating a stress wave along a wire, said delay line including in combination, a hollow cylinder of magnetic material having a spiral groove on the inside surface thereof, said groove being substantially rectangular in cross section, a wire positioned within said groove and forming a helix, first and second transducer means coupled to said wire, said first transducer means being responsive to an electrical signal applied thereto to impart a stress wave to said wire, said second transducer means being responsive to said stress wave to develop an electrical signal, means coupled to one of said transducer means for moving the same along said wire relative to the other of said transducer means, the duration of the delay being proportioned to the length of said wire positioned between said transducer means, said wire having end portions not positioned between said transducer means and not used for establishing the delay, and means damping said wire including a silicone compound filling said groove containing said end portions and substantially surrounding said end portions for absorbing the energy of the stress wave and preventing reflection of the stress wave from said end portions.

9. In a delay line wherein a delay is established by propagating a stress wave along a wire, the combination including, a hollow cylinder having a spiral groove on the inside surface thereof, said groove being substantially rectangular in cross section, a wire positioned within said groove and forming a helix, said wire having end portions extending from the portion of the wire used for establishing the delay, a closed cell foam resilient material within said groove and substantially surrounding said end portion for absorbing the energy of the stress wave and preventing reflections of the stress wave from said end portions, said resilient material including a mixture in the proportion of 20 grams of RTV–20 silicone with from 3 grams to 15 grams of methylene chloride.

No references cited.

HERMAN KARL SAALBACH, *Primary Examiner.*

A. R. MORGANSTERN, *Assistant Examiner.*